(12) United States Patent
Taves

(10) Patent No.: US 10,427,755 B1
(45) Date of Patent: Oct. 1, 2019

(54) CLUTCH FOR A MOTORCYCLE

(71) Applicant: Ben Taves, Sherwood Park (CA)

(72) Inventor: Ben Taves, Sherwood Park (CA)

( * ) Notice: Subject to any disclaimer, the term of this patent is extended or adjusted under 35 U.S.C. 154(b) by 163 days.

(21) Appl. No.: 15/704,038

(22) Filed: Sep. 14, 2017

Related U.S. Application Data

(60) Provisional application No. 62/394,370, filed on Sep. 14, 2016.

(51) Int. Cl.
| | |
|---|---|
| *B62M 25/02* | (2006.01) |
| *B62M 25/08* | (2006.01) |
| *B62K 23/06* | (2006.01) |
| *B62K 11/14* | (2006.01) |

(52) U.S. Cl.
CPC .............. *B62M 25/02* (2013.01); *B62K 23/06* (2013.01); *B62M 25/08* (2013.01); *B62K 11/14* (2013.01)

(58) Field of Classification Search
CPC .................. B62M 25/08; B62M 25/02; B62M 2701/0053; B62M 2701/0046; B62M 2701/0084; B62K 11/14; B62K 23/06; B62K 21/26; F16D 23/12; F16D 2023/126; F16H 59/105; F16H 2061/326; Y10T 74/20822; Y10T 74/2003; Y10T 74/2014; Y10T 74/20274; Y10T 74/2028
See application file for complete search history.

(56) References Cited

U.S. PATENT DOCUMENTS

| | | | |
|---|---|---|---|
| 1,429,528 A | 9/1922 | Payne | |
| 4,316,531 A * | 2/1982 | Harpster | B62K 23/06 192/114 R |
| 4,560,049 A | 12/1985 | Uchibaba et al. | |
| 6,227,342 B1 | 5/2001 | Armbruster et al. | |
| 6,318,490 B1 | 11/2001 | Laning | |
| 8,096,921 B2 * | 1/2012 | Hahn | B60K 23/02 192/114 R |
| 9,618,961 B2 * | 4/2017 | Oakes | B62K 23/06 |
| 9,783,258 B1 * | 10/2017 | Elwell | B62L 3/06 |
| 2008/0190729 A1 | 8/2008 | Stehr et al. | |
| 2009/0095592 A1 * | 4/2009 | Simmons | B62K 23/06 192/99 S |
| 2009/0139823 A1 | 6/2009 | Dyer | |
| 2009/0314605 A1 | 12/2009 | Haguen | |
| 2012/0186933 A1 | 7/2012 | Wishard et al. | |
| 2018/0015981 A1 * | 1/2018 | Elwell | G05G 5/06 |
| 2018/0223991 A1 * | 8/2018 | Royer | F16H 61/22 |

* cited by examiner

*Primary Examiner* — Daniel D Yabut

(74) *Attorney, Agent, or Firm* — Cramer Patent & Design, PLLC; Aaron R. Cramer

(57) ABSTRACT

A mechanism whereby a motorcycle operator may secure a clutch lever portion of a motorcycle in its depressed state, thereby preventing hand and/or arm fatigue. The mechanism includes an electrical solenoid which is clamped to a handlebar portion of the motorcycle, and in mechanical communication with the clutch lever of the motorcycle. The mechanism is automatically activated upon application of the braking portions of the motorcycle by the operator, causing the mechanism to hold the clutch lever inward, if pulled, thereby disengaging the clutch of the motorcycle. Normal operation of the motorcycle is resumed when the operator releases the brakes. The mechanism is envisioned to be especially useful, for example when an operator is at a standstill, such as while waiting at a street light, being delayed in traffic, or the like.

21 Claims, 8 Drawing Sheets

CLUTCH FOR A MOTORCYCLE

RELATED APPLICATIONS

The present invention was first described in and claims the benefit of U.S. Provisional Patent Application No. 62/394,370 filed on Sep. 14, 2016, the entire disclosures of which are incorporated herein by reference.

FIELD OF THE INVENTION

The present invention relates generally to a device enabling a clutch lever portion of a motorcycle to be secured in its depressed state, thereby preventing hand and/or arm fatigue.

BACKGROUND OF THE INVENTION

Countless Americans enjoy riding motorcycles. The feeling of freedom and pure exhilaration while cruising the countryside with the wind in your hair is a leisure time activity for many. Many others do it out of necessity in the time of rising gas prices, while others do it for pure enjoyment. While the operation of a motorcycle provides many benefits, the operation of the clutch, especially in heavy stop and go traffic is certainly not known as one (1) of them. Such repetitive operation quickly becomes fatiguing, even to the point of causing stress injuries over time. Accordingly, there exists a need for a means by which the operation of a motorcycle clutch can be enhanced to be less burdensome. The use of the present invention provides motorcycles riders an alternative method of releasing their clutch in a manner that is quick, easy, and effective.

SUMMARY OF THE INVENTION

In view of the foregoing disadvantages inherent in the prior art, it has been observed that there is need of a device enabling a clutch lever portion of a motorcycle to be secured in its depressed state.

To achieve the above and other objectives, the present invention provides for a clutch lock, comprising a handlebar clamp, which is capable of being secured about a handlebar of the motorcycle, a solenoid clamp, a first swivel means for swivelly securing the handlebar clamp adjacent to the solenoid clamp, a solenoid which is secured within the solenoid clamp and in electrical communication with a front brake lever, a solenoid shaft which protrudes from a distal end of the solenoid, a locking bracket, a second swivel means for swivelly securing a proximal end of the locking bracket to a distal end of the solenoid shaft, a lever captivating plate which is capable of retaining a clutch lever of the motorcycle therein and a rotational means for securing a distal end of the locking bracket to a proximal end of the lever captivating plate. When the front brake lever is actuated, an electrical signal is conducted to the solenoid which results in an extension of the solenoid shaft. The extension of the solenoid shaft causes the second swivel means to swivel the locking bracket. When the locking bracket swivels, the locking bracket causes the rotational means to rotate the lever captivating plate. Finally, the rotation of the lever captivating plate retains the clutch lever of the motorcycle in a disengaged state.

The handlebar clamp may comprise a handlebar clamp first half which has a first hemispherical cutout, a handlebar clamp second half which has a second hemispherical cutout and a pair of handlebar clamp fasteners which are configured to removably secure the first hemispherical cutout and the second hemispherical cutout about the handlebar. The solenoid clamp may comprise a solenoid clamp first half which has a third hemispherical cutout, a solenoid clamp second half which has a fourth hemispherical cutout and a pair of solenoid clamp fasteners which are configured to removably secure the third hemispherical cutout and the fourth hemispherical cutout about the solenoid.

The first swivel means may comprise a first swivel plate which is secured perpendicularly at a first swivel plate first end subjacent the handlebar clamp second half on a side of the handlebar clamp second half opposite the second hemispherical cutout, a second swivel plate which is secured perpendicularly on a side of the solenoid clamp first half opposite the third hemispherical cutout and a first swivel means fastener which swivelly secures the first swivel plate to the second swivel plate adjacent a first swivel plate second end.

The second swivel means may comprise a rod end swivel which is secured at a first end to the distal end of the solenoid shaft and secured subjacent the proximal end of the locking bracket and a second swivel means fastener which swivelly secures the rod end swivel to the locking bracket. The rotational means may comprise an axle bolt which rotationally secures a proximal end of the lever captivating plate to the distal end of the locking bracket and a sleeve which is disposed about the axle bolt and between the lever captivating plate and the locking bracket. The sleeve maintains a distance between the lever captivating plate and the locking bracket. The lever captivating plate may also comprise a pair of protrusions defining a space between each protrusion which is suitable for encompassing a portion of said clutch lever.

In a separate embodiment, the clutch lock may comprise a handlebar clamp capable of being secured about a first handlebar of the motorcycle, a solenoid clamp, a solenoid secured within the solenoid clamp and in electrical communication with a front brake lever, a solenoid cable which protrudes from a distal end of the solenoid, a solenoid cable clamp capable of being secured about a second handlebar of the motorcycle adjacent a distal end of the solenoid cable, a locking bracket, a swivel means for swivelly securing a proximal end of the locking bracket to the distal end of the solenoid cable, a lever captivating plate capable of retaining a clutch lever of the motorcycle therein and a rotational means for securing a distal end of the locking bracket to a proximal end of the lever captivating plate. When the front brake lever is actuated, an electrical signal is conducted to the solenoid, resulting in a retraction of the solenoid cable. The retraction of the solenoid cable causes the swivel means to swivel the locking bracket. When the locking bracket swivels, the locking bracket causes the rotational means to rotate the lever captivating plate Finally, the rotation of the lever captivating plate retains the clutch lever of the motorcycle in a disengaged state. The other feature of this embodiment, that varies from the first described embodiment is that the solenoid cable clamp may comprise a solenoid cable clamp first half having a hemispherical cutout, a solenoid cable clamp second half also having a hemispherical cutout and a pair of solenoid cable clamp fasteners configured to removably secure the hemispherical cutouts about the second handlebar.

In yet another separate embodiment, the clutch lock may comprise a handlebar clamp capable of being secured about a first handlebar of the motorcycle, a solenoid clamp, a vacuum solenoid secured within the solenoid clamp, a solenoid cable which protrudes from a distal end of the solenoid, a solenoid cable clamp which is capable of being secured about a second handlebar of the motorcycle adjacent a distal end of the solenoid cable, a locking bracket, a swivel means for swivelly securing a proximal end of the locking bracket to the distal end of the solenoid cable, a lever captivating plate capable of retaining a clutch lever of the motorcycle therein and a rotational means for securing a distal end of the locking bracket to a proximal end of the lever captivating plate. The vacuum solenoid comprises a vacuum hose which is capable of being in pneumatic communication with the vacuum solenoid at a first end and a vacuum source from an engine of the motorcycle at a second end and a vacuum solenoid valve which is disposed between the vacuum hose first end and the vacuum hose second end and is capable of being in electrical communication with a front brake lever of the motorcycle. When the front brake lever is actuated, an electrical signal is conducted to the vacuum solenoid resulting in a retraction of the solenoid cable. The retraction of the solenoid cable causes the swivel means to swivel the locking bracket. When the locking bracket swivels, the locking bracket causes the rotational means to rotate the lever captivating plate. Finally, the rotation of the lever captivating plate retains the clutch lever of the motorcycle in a disengaged state.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
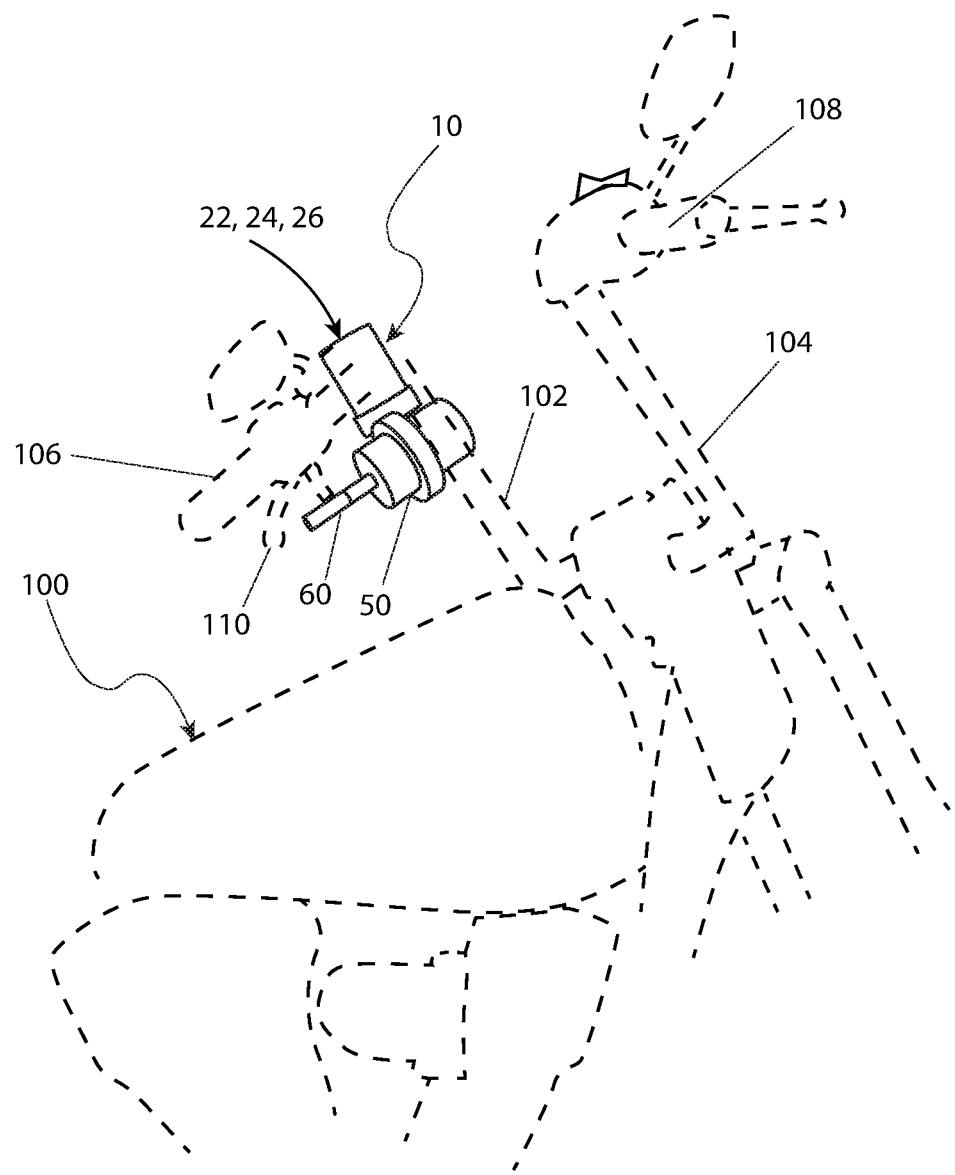
FIG. 1 is an environmental view of a motorcycle clutch lock 10 depicting installation upon an existing motorcycle 100, in accordance with the preferred embodiment of the present invention.

DESCRIPTIVE KEY 10 motorcycle clutch lock
22 handlebar clamp
22a handlebar clamp first half
22b handlebar clamp second half
22c handlebar clamp aperture
24a first swivel plate
24b second swivel plate
25 swivel plate post
26 first solenoid clamp
26a first solenoid clamp first half
26b first solenoid clamp second half
26c first solenoid clamp aperture
50 first solenoid
52 first solenoid shaft
54 rod end swivel
60 locking bracket
62 arm
64 sleeve
66 lever captivating plate
68 protrusion
70 axle bolt
80 threaded fastener
82 nut fastener
84 wiring
100 motorcycle
102 left handlebar
104 right handlebar
106 left hand grip
108 right hand grip
110 clutch lever
200 alternate solenoid mount assembly
226 second solenoid clamp
226a second solenoid clamp first half
226b second solenoid clamp second half
226c second solenoid clamp aperture
250 second solenoid
252a cable sheath
252b cable collar
252c second solenoid cable
254 cable end swivel
270 cable clamp assembly
272a cable clamp first half
272b cable clamp second half
272c cable clamp aperture
272d cable clamp slot
300 vacuum solenoid canister
302 vacuum nipple
304 vacuum hose
305 vacuum solenoid valve
320 vacuum solenoid clamp assembly

DETAILED DESCRIPTION OF THE PREFERRED EMBODIMENT

Figure 4:
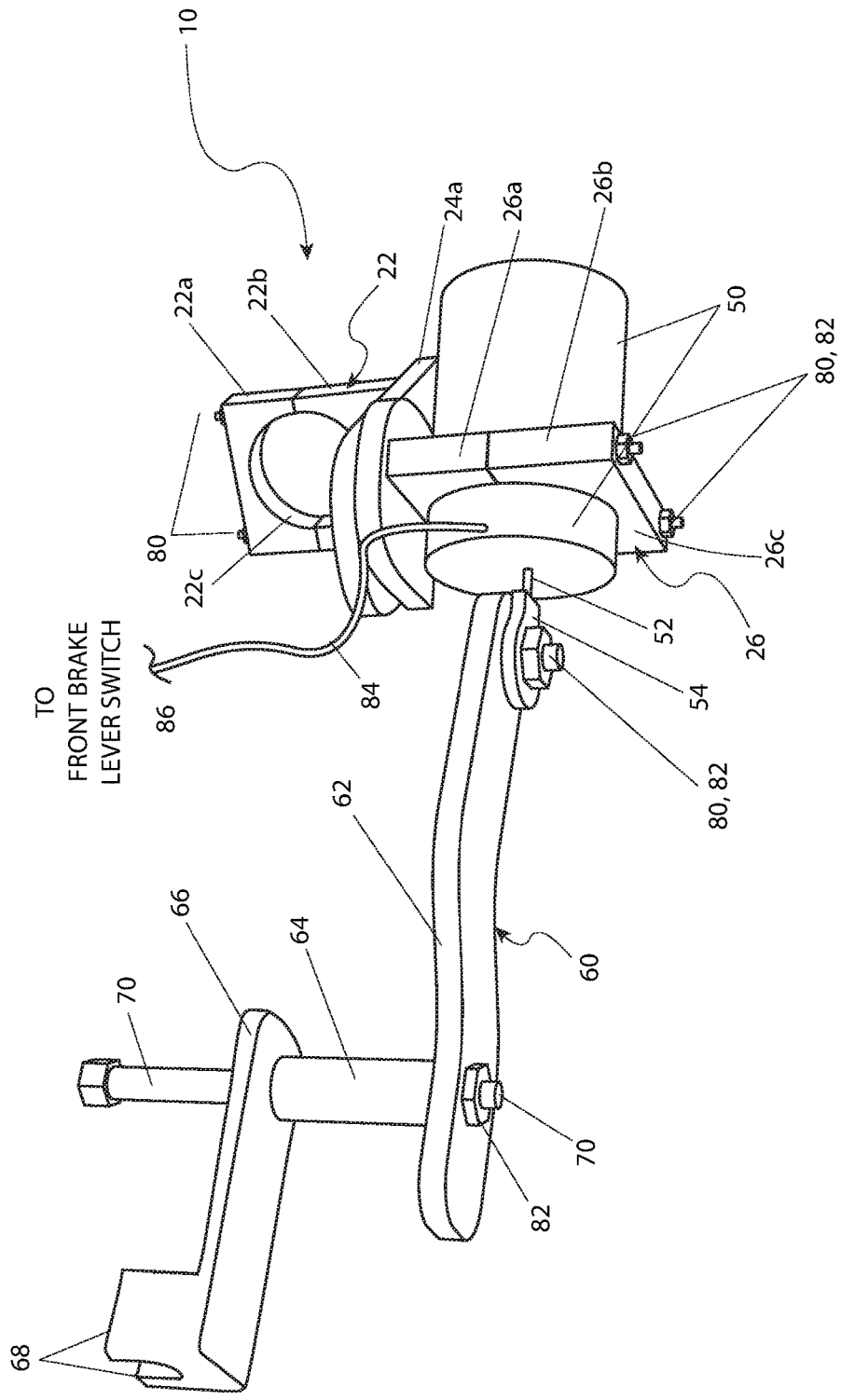
FIG. 4 is an isolated view of solenoid and lever arm portions of the motorcycle clutch lock 10, according to a preferred embodiment of the present invention.
Figure 5:
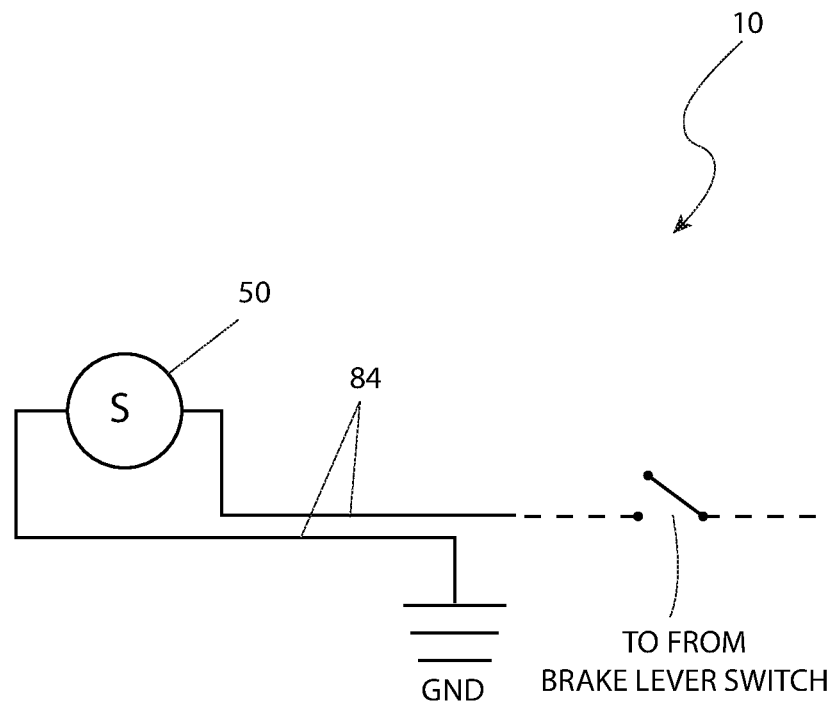
FIG. 5 is an electrical block diagram of the motorcycle clutch lock 10 in accordance with the preferred embodiment of the present invention.
Figure 6A:
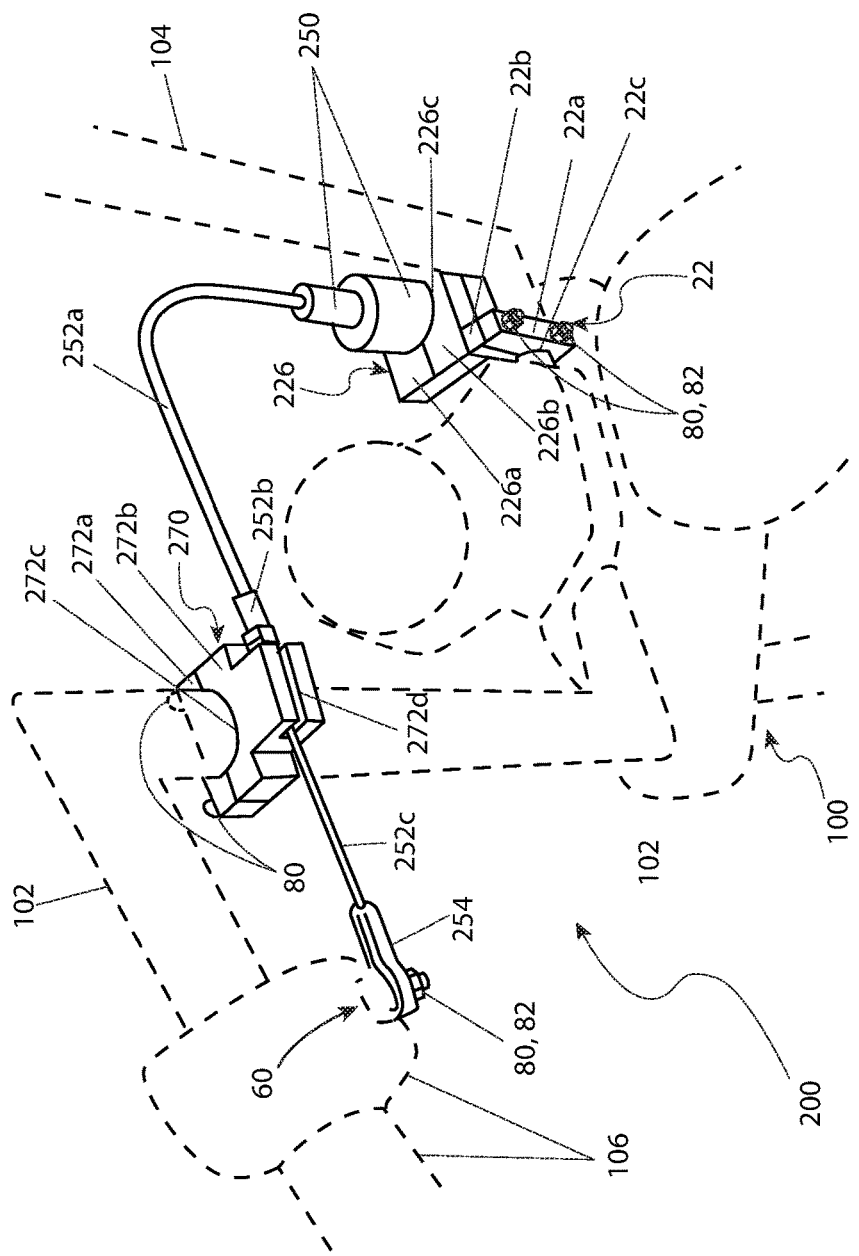
FIG. 6a is a perspective view of an alternate solenoid mount assembly 200, according to an alternate embodiment of the present invention.
Figure 6B:
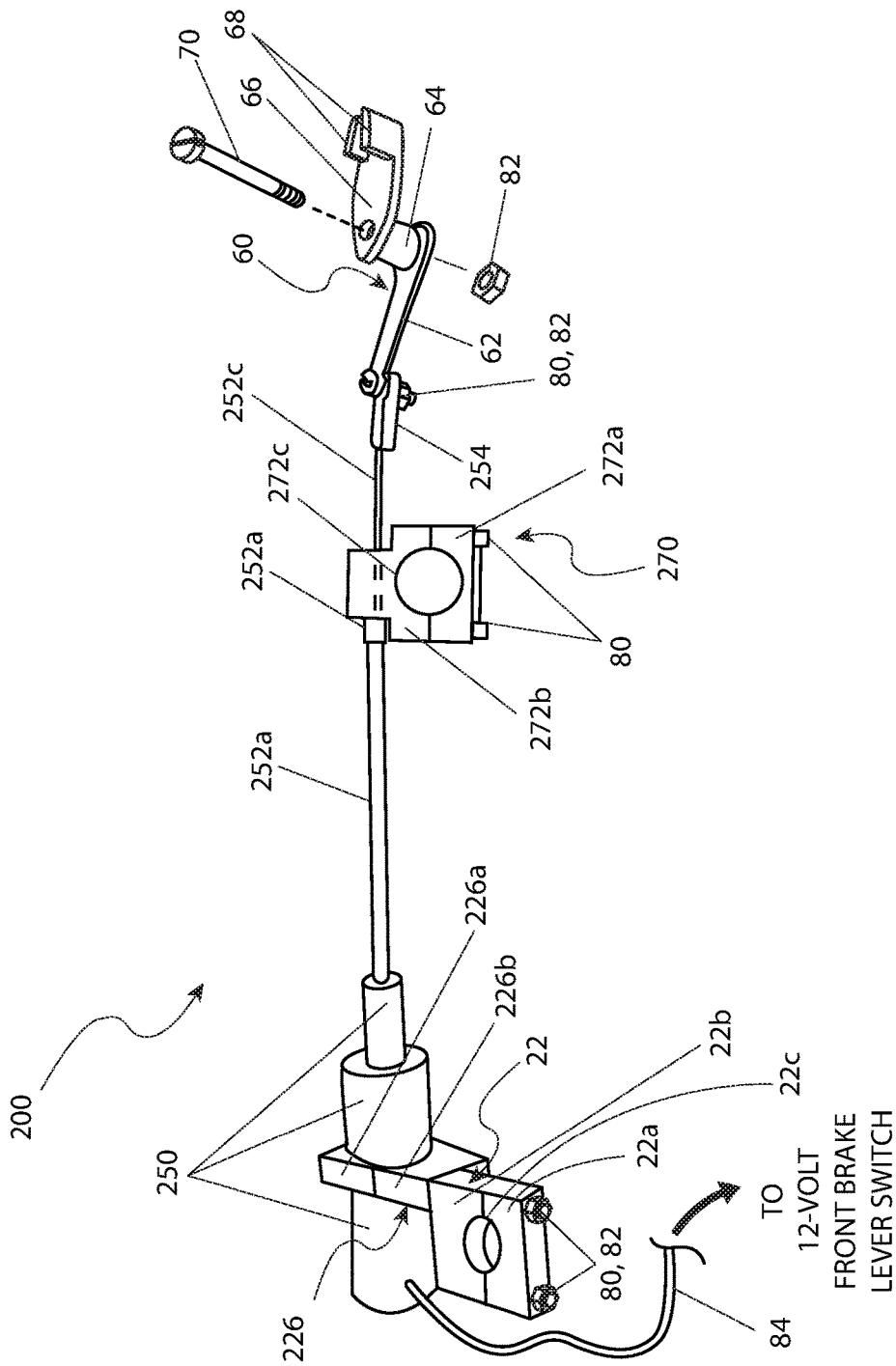
FIG. 6b is an isolated view of the alternate solenoid mount assembly 200, according to an alternate embodiment of the present invention; and, FIG. 7 is a perspective view of the alternate solenoid assembly 200 utilizing a vacuum solenoid portion canister 300, according to an alternate embodiment of the present invention.
Figure 7:
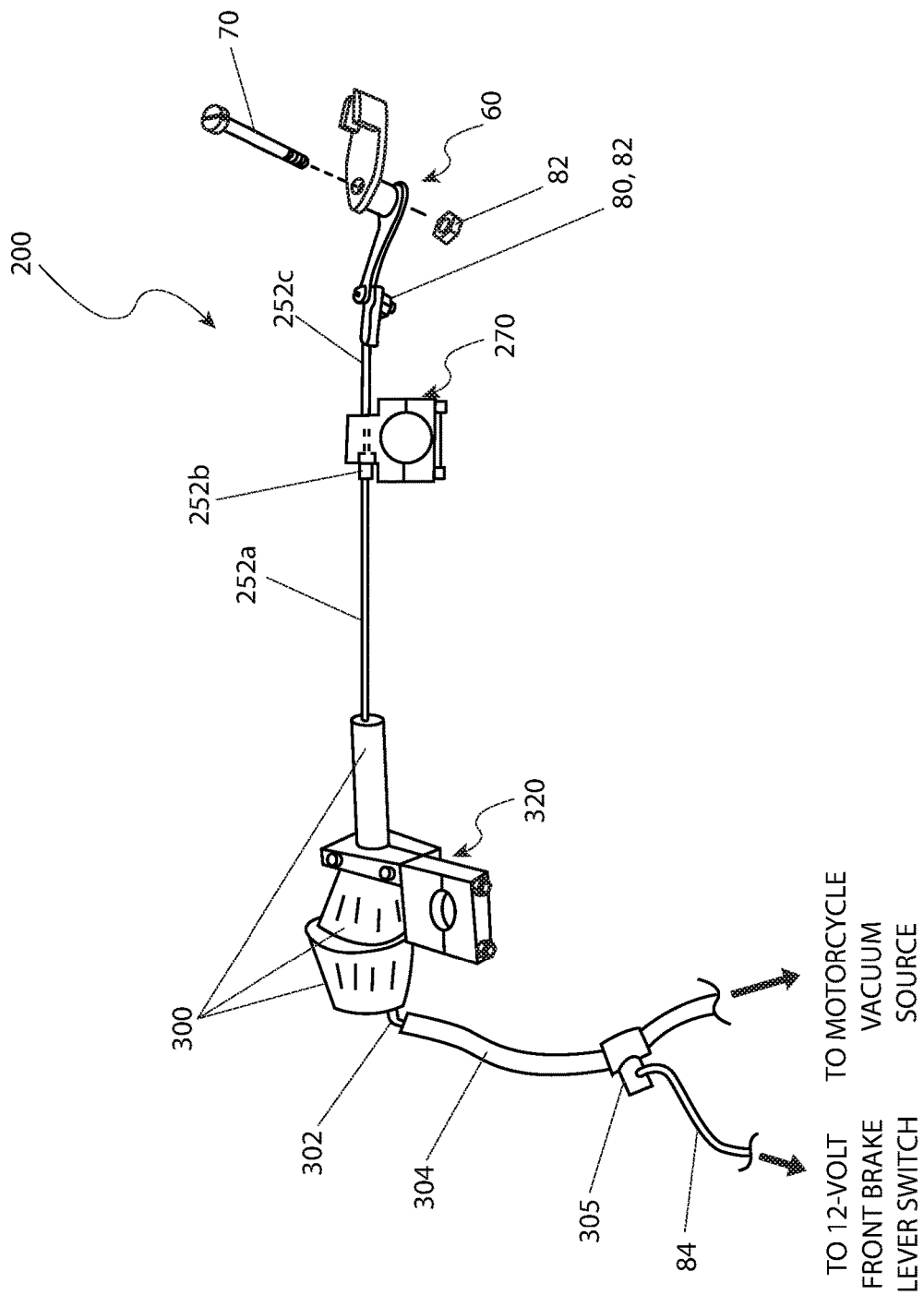

The best mode for carrying out the invention is presented in terms of its preferred embodiment, herein depicted within FIGS. 1-5, and in terms of an alternate embodiment, herein depicted within FIGS. 6a-7. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a motorcycle clutch lock (herein described as the "apparatus") 10, which provides a mechanism whereby a motorcycle operator may secure a clutch lever portion 110 of the motorcycle in a disengaged position for a desired period of time so as to prevent hand and/or arm fatigue. The apparatus 10 is envisioned to be especially useful, for example, while the motorcycle and operator are at a standstill, such as while waiting at a street light, being delayed in traffic, or the like. The embodiments of the apparatus 10 described herein depict portions specifically suitable for retrofitting the apparatus 10 to existing makes and models of motorcycles 100; however, it is understood that the teachings of the apparatus 10 may also be incorporated into new motorcycle designs and be provided as standard or optional equipment with equal benefit, and as such should not be interpreted as a limiting factor.

Referring now to FIG. 1, an environmental view of the apparatus 10 depicting installation of the apparatus 10 upon an existing motorcycle 100, in accordance with the preferred embodiment of the present invention, is disclosed. The apparatus 10 includes an electrical first solenoid 50 in mechanical communication with an existing clutch lever portion 110 of the motorcycle 100. The first solenoid 50 is envisioned to be mounted to a left handlebar portion 102 of the motorcycle 100, adjacent to a left hand grip portion 106, via a handlebar clamp 22 (see FIGS. 2 and 3).

The motorcycle operator may activate the apparatus 10, when desired, to retain the clutch lever 110 and corresponding clutch portion of the motorcycle 100 in the disengaged state, by activating an existing front brake lever switch by pressing upon an existing front brake lever, which provides electrical power to the first solenoid 50 (also see FIG. 5).

It is envisioned that the major portions of the apparatus 10 would be manufactured using, cast, machined, or otherwise fabricated parts made using weather-resistant materials such as stainless steel, anodized aluminum, and the like. Furthermore, it is envisioned that the apparatus 10 would be made available in various models specifically configured for installation upon different makes and models of motorcycles 100.

Figure 2:
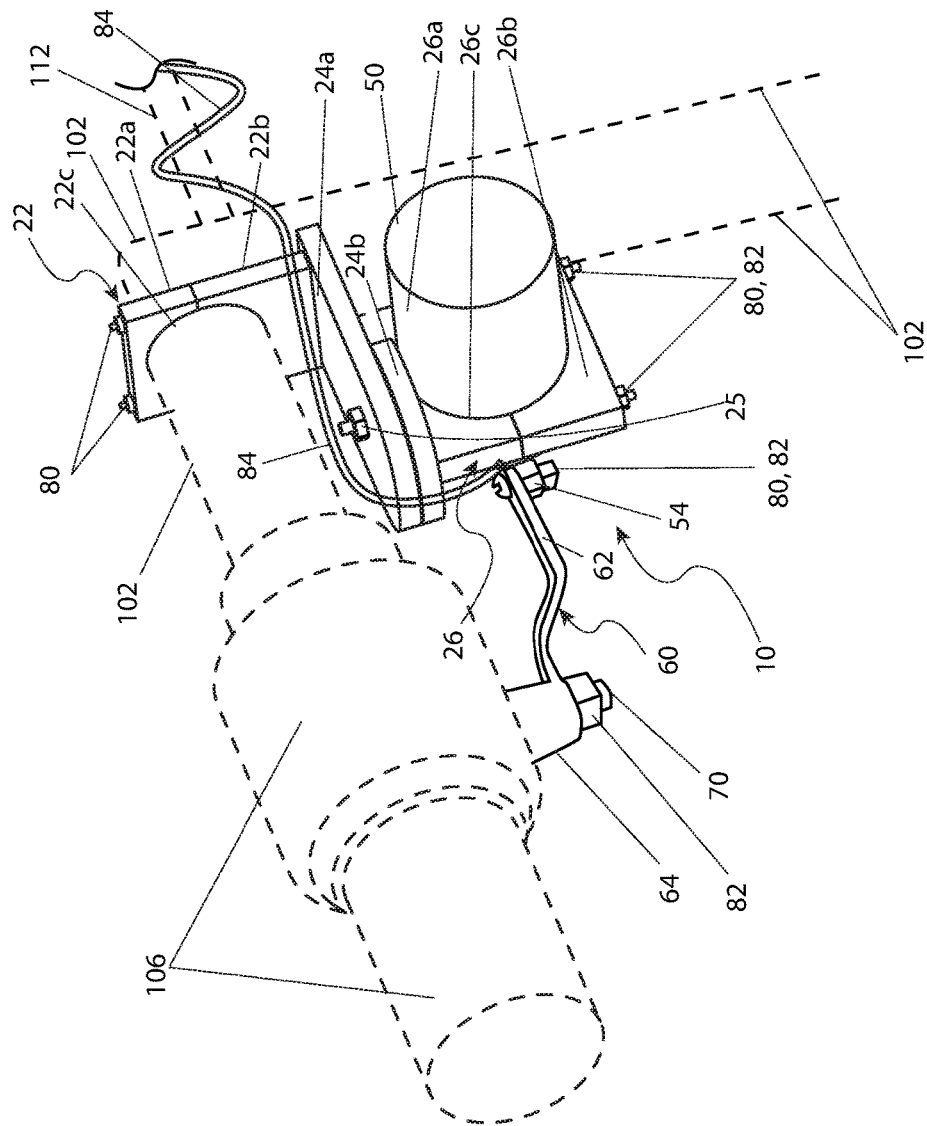
FIG. 2 is a rear perspective view of the motorcycle clutch lock 10 in accordance with the preferred embodiment of the present invention.
Figure 3:
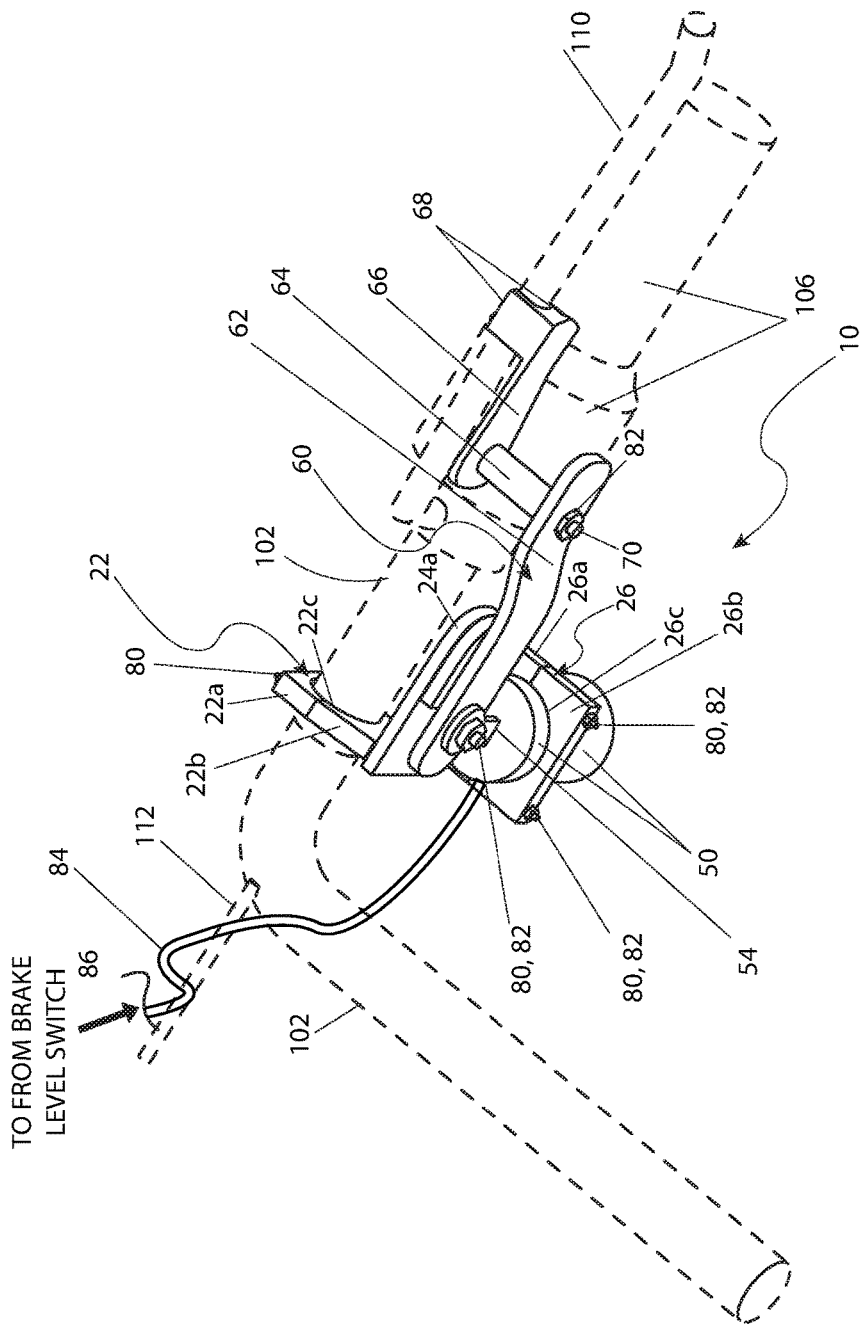
FIG. 3 is a bottom perspective view of the motorcycle clutch lock 10 in accordance with the preferred embodiment of the present invention.

Referring now to FIGS. 2, 3, and 4, perspective and isolated views of the apparatus 10, according to the preferred embodiment of the present invention, are disclosed. The apparatus 10 includes a handlebar clamp 22 and a first solenoid clamp 26 which provide a means of attachment and positioning of the first solenoid 50 upon a left handlebar portion 102, adjacent to the left hand grip 106. Each clamp 22, 26 is made using a two-piece split clamp unit. The clamps 22, 26 are conjoined in a pivoting manner by respective first swivel plate 24a and second swivel plate 24b portions which act to prevent possible mechanical binding during operation of the apparatus 10. The first swivel plate portion 24a affixed to bottom surface of the handlebar clamp 22, and the second swivel plate 24b being affixed to a top surface of the first solenoid clamp 26 via threaded fasteners 80 and nut fasteners 82. The swivel plates 24a, 24b are envisioned to be generally circular in shape and provide parallel mating surfaces to form a bearing surface, which allows the clamps 22, 26 to rotate freely with respect to each other as the first solenoid 50 is extended. The pivot plates 24a, 24b are held in relative position via a pivot plate post portion 25. The threaded swivel plate post 25 protrudes upwardly from an upper surface portion of the first solenoid first clamp half 26a; passing through the pivot plates 24a, 24b; and, is secured in place using a nut fastener 82 (see FIGS. 2, 3 and 4).

The handlebar clamp 22 includes an upper handlebar clamp first half 22a and a lower handlebar clamp second half 22b, being secured together via a pair of threaded fasteners 80 and nut fasteners 82. The handlebar clamp first half 22a and handlebar clamp second half 22b each have a semicircular center opening, which jointly form a circular handlebar clamp aperture 22c through which the left handlebar 102 is inserted and clamped in position.

The first solenoid clamp 26 is located subjacent to the second pivot plate 24b and includes a first solenoid first clamp half 26a and a first solenoid second clamp half 26b. The upper first solenoid first clamp half 26a and lower first solenoid second clamp half 26b portions provide similar function and construction as the aforementioned handlebar clamp first half 22a and handlebar clamp second half 22b portions. The first solenoid first clamp half 26a and first solenoid second clamp half 26b portions are also affixed together using threaded fasteners 80 and nut fasteners 82, and jointly form a first solenoid clamp aperture 26c through which the cylindrical first solenoid 50 is inserted and clamped in place.

The first solenoid 50 is envisioned to be a cylindrical-bodied shaft-type device with an internal electromagnet. When energized, a linear first solenoid shaft portion 52 of the first solenoid 50 is extended from an end portion of the first solenoid 50, resulting in retention of the clutch lever 110 portion of the motorcycle 100 in a depressed or "clutch-disengaged" position. When the electromagnet is de-energized, the first solenoid shaft 52 floats freely, allowing the operator to release the clutch lever 110 and engage the clutch of the motorcycle 100 in a normal manner.

The first solenoid shaft portion 52 of the first solenoid 50 is in mechanical communication with the clutch lever portion 110 of the motorcycle 100 via a locking bracket 60. The first solenoid shaft 52 is threadingly affixed to a rod end swivel 54 which in turn is affixed to the "Z"-shaped locking bracket 60 via a threaded fastener 80 and a nut fastener 82. The locking bracket 60 is envisioned to be a weldment, cast, or molded part which includes three (3) integral portions including an arm 62, a hollow cylindrical sleeve 64, and a lever captivating plate 66. The lever captivating plate 66 includes a pair of parallel and perpendicularly extending protrusions 68, which encompass a portion of the clutch lever 110 as seen in FIG. 3.

The intermediate sleeve portion 64 of the locking bracket 60 is rotatably affixed to the pivot portion of the clutch lever 110 via an axle bolt 70. The axle bolt 70 is envisioned to replace an existing pivoting bolt portion of the clutch lever 110. When installed, the axle bolt 70 passes through both the clutch lever 110 and the sleeve 64 portion of the locking bracket 60. The locking bracket 60 is then secured to the axle bolt 70 by installing a nut fastener 82 at a bottom end portion of the axle bolt 70. In use, an operator presses upon an existing front brake lever portion of the motorcycle 100 which provides electrical power to the first solenoid 50 via electrical wiring 84, which in turn causes extension of the first solenoid shaft 52. The first solenoid shaft 52 causes rotation of the arm 62 upon the axle bolt 70 and counter-rotation of the lever captivating plate 66. The protrusion portions 68 of the lever captivating plate 66 then position the clutch lever 110 in the "clutch-disengaged" position.

Referring now to FIG. 5, an electrical block diagram of the apparatus 10 in accordance with the preferred embodiment of the present invention, is disclosed. The apparatus 10 includes a simple direct current (DC) circuit which provides activation of the first solenoid 50 by utilizing existing 12-volt electrical system of the motorcycle 100 via application of the existing front brake lever which in turn activates a brake light switch portion. The first solenoid 50 is in electrical communication with the front brake lever switch portion of the motorcycle 100 via wiring 84. The first solenoid 50 is extended as the brake lamp circuit provides a flow of 12-volt current through the wiring 84 to an internal electromagnet portion of the first solenoid 50.

Referring now to FIGS. 6a and 6b, perspective and isolated views of an alternate solenoid mount assembly 200, according to an alternate embodiment of the present invention, is disclosed. The alternate solenoid mount assembly 200 provides additional mounting adaptability by enabling mounting of a cable-type second solenoid 250 to various positions along the left 102 or right 104 handlebar portions, as desired.

The second solenoid 250 provides a means to retract an integral flexible second solenoid cable 252c which in turn acts upon the previously described arm portion 62 of the locking bracket 60 via an integral end swivel portion 254 of the second solenoid cable 252a. The second solenoid cable 252c provides a means for remote mounting of the second solenoid 250. The alternate solenoid mount assembly 200 includes a handlebar clamp 22 (also see FIGS. 2 and 3), a conjoined second solenoid clamp 226, the second solenoid cable 252c, and a cable clamp assembly 270. The second solenoid 250 is envisioned to provide a similar cylindrical body shape as the previously described first solenoid 50 but utilizes an internal electromagnet to act upon the outwardly extending cable 252c. The second solenoid clamp 226 is similar in construction as the previously described first solenoid clamp 26, but provides second solenoid clamp first half 226a and second solenoid clamp second half 226b portions to form a second solenoid clamp aperture 226c being particularly sized to clamp and secure the second solenoid 250 in position.

The cable clamp assembly 270 provides further mounting configurations being attachable to the handlebars 102, 104 in a similar manner as the handlebar clamp 22. The cable clamp assembly 270 includes a cable clamp first half 272a and a cable clamp second half 272b, which form a cable clamp aperture 272c into which the handlebar 102, 104 is inserted and clamped into position. The cable clamp first half 272a further includes a cable slot 272d which receives and positions the second solenoid cable 252a as well as providing threaded engagement of the cable collar portion 252b of the cable sheath 252a.

Referring now to FIG. 7, a perspective view of the alternate solenoid assembly 200 depicting utilization of a vacuum solenoid canister 300, according to an alternate embodiment of the present invention, is disclosed. Further adaptability of the apparatus 10 is illustrated here in an embodiment of the alternate solenoid assembly 200 which utilizes a vacuum solenoid canister 300 in lieu of the electrical second solenoid 250 (see FIGS. 6a and 6b). The alternate solenoid assembly 200 would be equipped with the vacuum solenoid canister 300 and a correspondingly sized vacuum solenoid clamp assembly 320. The alternate solenoid assembly 200 would be mounted to the handlebar portions 102, 104 of the motorcycle 100 in a similar manner as previously described in FIGS. 6a and 6b. A typical cable-type vacuum solenoid canister 300 is shown here for illustration sake. The vacuum solenoid canister 300 is illustrated here with accompanying equipment to provide control and connection to an existing vacuum source including an integral vacuum port 302, a length of vacuum hose 304, and a vacuum solenoid valve 305. One (1) end of the vacuum hose 304 would be connected to the vacuum port 302, and the other end to an existing vacuum source on the motorcycle 100 such as a fuel intake manifold portion of the motor. The vacuum solenoid valve 305 would be an in-line DC-type unit being in electrical communication with the front brake lever switch portion of the motorcycle 100.

It is envisioned that other styles and configurations of the present invention can be easily incorporated into the teachings of the present invention, and only one (1) particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and preparing the apparatus 10 for use may be achieved by performing the following steps: procuring a model of the apparatus 10 being configured for installation upon a specific motorcycle 100; installing the axle bolt 70 by removing the original bolt portion of the clutch lever 110 and inserting the axle bolt 70; inserting the sleeve portion 64 of the locking bracket 60 onto the axle bolt 70 and securing using a nut fastener 82; assembling the handlebar clamp 22, swivel plates 24a, 24b, and first solenoid clamp 26 loosely together using provided threaded fasteners 80 and nut fasteners 82; attaching the handlebar clamp portion 22 loosely to the left handlebar portion 102 of the motorcycle 100 adjacent to the left grip 106; inserting the first solenoid 50 into the first solenoid clamp 26; attaching the arm portion 62 of the locking bracket 60 to the rod end swivel portion 54 of the first solenoid 50 using provided fasteners 80, 82, if not previously installed; tightening all fasteners 70, 80, 82; testing for any binding of the apparatus 10 by activating the clutch lever 110 in a manual manner; establishing a 12-volt electrical connection between the existing front brake lever switch portion of the motorcycle 100 and the first solenoid 50 by routing wiring 84 in between. The apparatus 10 is now ready for use.

The method of utilizing the apparatus 10 may be achieved by performing the following steps: starting the motorcycle 100 in a normal manner; operating the motorcycle 100 in a normal manner until arriving at a street light, being delayed in traffic, or the like; employing the function of the apparatus 10 to hold the clutch lever 100 in its "disengaged" position by pressing upon an existing front brake lever portion of the motorcycle 100 which activates a brake lamp switch which conducts power to the first solenoid 50 via interconnected wiring 84; releasing the clutch lever 110 by gripping the left grip 106 and clutch lever 110 in a normal manner and deactivating the apparatus 10 by releasing the front brake lever portion of the motorcycle 100; resuming normal operation of the motorcycle 100 by releasing the clutch lever 110 in a normal manner; and, benefiting from reduced hand and arm fatigue associated with holding in a motorcycle clutch lever 110 for an extended period of time, afforded a user of the present invention 10.

The method of installing and utilizing the alternate solenoid mount assembly 200 equipped with the second solenoid 250 may be achieved by performing the following steps: procuring a model of the apparatus 10 being configured for installation upon a specific motorcycle 100; installing the axle bolt 70 as described above; assembling the handlebar clamp 22 and second solenoid clamp 226 together using provided fasteners 80, 82; attaching the handlebar clamp portion 22 loosely at a desired location upon a handlebar portion 102, 104; inserting the second solenoid 250 into the second solenoid clamp 226; attaching the cable end swivel portion 254 of the second solenoid 250 to the arm portion 62 of the locking bracket 60; installing the cable clamp assembly 270 to a desired location upon the handlebar 102, 104;

inserting the second solenoid cable 252c into the cable clamp slot 272d; threadingly engaging the cable collar 252b into the cable clamp slot 272d; tightening all fasteners 70, 80, 82; testing for any binding of the apparatus 10 by activating the clutch lever 110 in a manual manner; establishing a 12-volt electrical connection between the existing front brake lever switch portion of the motorcycle 100 and the second solenoid 250 by routing wiring 84 in between; and, utilizing the alternate solenoid mount assembly 200 during operation of the motorcycle 100 in a similar manner as the preferred embodiment 10 as previously described.

The method of installing and utilizing the alternate solenoid mount assembly 200 equipped with the vacuum solenoid canister 300 may be achieved by performing the following additional steps: assembling and mounting the vacuum solenoid clamp assembly 320 to a desired location upon a handlebar portion 102, 104; routing and attaching the vacuum hose portion 304 of the vacuum solenoid canister 300 to an existing vacuum source on the motorcycle 100 such as a fuel intake manifold; and, routing and connecting the wiring 84 for the vacuum solenoid valve 305 to the existing front brake lever switch portion of the motorcycle 100.

The embodiments of the apparatus 10 described herein depict retrofitable models suitable for installation onto existing makes and models of motorcycles 100. However, it is understood that the teachings of the apparatus 10 may also be integrated into portions of a design of a new motorcycle 100, and be provided as standard or optional equipment.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A clutch lock, comprising:
a handlebar clamp, capable of being secured about a handlebar of a motorcycle;
a solenoid clamp;
a first swivel means for swivelly securing said handlebar clamp adjacent said solenoid clamp;
a solenoid secured within said solenoid clamp and in electrical communication with a front brake lever;
a solenoid shaft protruding from a distal end of said solenoid;
a locking bracket;
a second swivel means for swivelly securing a proximal end of said locking bracket to a distal end of said solenoid shaft;
a lever captivating plate capable of retaining a clutch lever of said motorcycle therein; and,
a rotational means for securing a distal end of said locking bracket to a proximal end of said lever captivating plate;
wherein when said front brake lever is actuated, an electrical signal is conducted to said solenoid, resulting in an extension of said solenoid shaft;
wherein said extension of said solenoid shaft causes said second swivel means to swivel said locking bracket;
wherein when said locking bracket swivels, said locking bracket causes said rotational means to rotate said lever captivating plate; and,
wherein said rotation of said lever captivating plate retains said clutch lever of said motorcycle in a disengaged state.

2. The lock of claim 1, wherein said handlebar clamp comprises:
a handlebar clamp first half having a first hemispherical cutout;
a handlebar clamp second half having a second hemispherical cutout; and,
a pair of handlebar clamp fasteners configured to removably secure said first hemispherical cutout and said second hemispherical cutout about said handlebar.

3. The lock of claim 2, wherein said solenoid clamp comprises:
a solenoid clamp first half having a third hemispherical cutout;
a solenoid clamp second half having a fourth hemispherical cutout; and,
a pair of solenoid clamp fasteners configured to removably secure said third hemispherical cutout and said fourth hemispherical cutout about said solenoid.

4. The lock of claim 3, wherein said first swivel means comprises:
a first swivel plate secured perpendicularly at a first swivel plate first end subjacent said handlebar clamp second half on a side of said handlebar clamp second half opposite said second hemispherical cutout;
a second swivel plate secured perpendicularly on a side of said solenoid clamp first half opposite said third hemispherical cutout; and,
a first swivel means fastener which swivelly secures said first swivel plate to said second swivel plate adjacent a first swivel plate second end.

5. The lock of claim 4, wherein said second swivel means comprises:
a rod end swivel secured at a first end to said distal end of said solenoid shaft and secured subjacent said proximal end of said locking bracket; and,
a second swivel means fastener which swivelly secures said rod end swivel to said locking bracket.

6. The lock of claim 5, wherein said rotational means comprises:
an axle bolt rotationally securing said proximal end of said lever captivating plate to said distal end of said locking bracket; and,
a sleeve disposed about said axle bolt and between said lever captivating plate and said locking bracket;
wherein said sleeve maintains a distance between said lever captivating plate and said locking bracket.

7. The lock of claim 6, wherein said lever captivating plate comprises a pair of protrusions defining a space between each protrusion capable of encompassing a portion of said clutch lever.

8. A clutch lock, comprising:
a handlebar clamp capable of being secured about a first handlebar of a motorcycle;
a solenoid clamp;
a solenoid secured within said solenoid clamp and in electrical communication with a front brake lever;
a solenoid cable protruding from a distal end of said solenoid;
a solenoid cable clamp capable of being secured about a second handlebar of said motorcycle adjacent a distal end of said solenoid cable;

a locking bracket;
a swivel means for swivelly securing a proximal end of said locking bracket to said distal end of said solenoid cable;
a lever captivating plate capable of retaining a clutch lever of said motorcycle therein; and,
a rotational means for securing a distal end of said locking bracket to a proximal end of said lever captivating plate;
wherein when said front brake lever is actuated, an electrical signal is conducted to said solenoid, resulting in a retraction of said solenoid cable;
wherein said retraction of said solenoid cable causes said swivel means to swivel said locking bracket;
wherein when said locking bracket swivels, said locking bracket causes said rotational means to rotate said lever captivating plate; and,
wherein said rotation of said lever captivating plate retains said clutch lever of said motorcycle in a disengaged state.

9. The lock of claim 8, wherein said handlebar clamp comprises:
a handlebar clamp first half having a first hemispherical cutout;
a handlebar clamp second half having a second hemispherical cutout; and,
a pair of handlebar clamp fasteners configured to removably secure said first hemispherical cutout and said second hemispherical cutout about said first handlebar.

10. The lock of claim 9, wherein said solenoid clamp comprises:
a solenoid clamp first half having a third hemispherical cutout;
a solenoid clamp second half having a fourth hemispherical cutout; and,
a pair of solenoid clamp fasteners configured to removably secure said third hemispherical cutout and said fourth hemispherical cutout about said solenoid.

11. The lock of claim 10, wherein said solenoid cable clamp comprises:
a solenoid cable clamp first half having a fifth hemispherical cutout;
a solenoid cable clamp second half having a sixth hemispherical cutout; and,
a pair of solenoid cable clamp fasteners configured to removably secure said fifth hemispherical cutout and said sixth hemispherical cutout about said second handlebar.

12. The lock of claim 11, wherein said swivel means comprises:
a cable end swivel secured at a first end to said distal end of said solenoid cable and secured subjacent said proximal end of said locking bracket; and,
a swivel means fastener which swivelly secures said cable end swivel to said locking bracket.

13. The lock of claim 12, wherein said rotational means comprises:
an axle bolt rotationally securing said proximal end of said lever captivating plate to said distal end of said locking bracket; and,
a sleeve disposed about said axle bolt and between said lever captivating plate and said locking bracket;
wherein said sleeve maintains a distance between said lever captivating plate and said locking bracket.

14. The lock of claim 13, wherein said lever captivating plate comprises a pair of protrusions defining a space between each protrusion capable of encompassing a portion of said clutch lever.

15. A clutch lock, comprising:
a handlebar clamp capable of being secured about a first handlebar of a motorcycle;
a solenoid clamp;
a vacuum solenoid secured within said solenoid clamp comprising:
a vacuum hose capable of being in pneumatic communication with said vacuum solenoid at a first end and a vacuum source from an engine of said motorcycle at a second end; and,
a vacuum solenoid valve disposed between said vacuum hose first end and said vacuum hose second end and capable of being in electrical communication with a front brake lever of said motorcycle;
a solenoid cable protruding from a distal end of said solenoid;
a solenoid cable clamp capable of being secured about a second handlebar of said motorcycle adjacent a distal end of said solenoid cable;
a locking bracket;
a swivel means for swivelly securing a proximal end of said locking bracket to said distal end of said solenoid cable;
a lever captivating plate capable of retaining a clutch lever of said motorcycle therein; and,
a rotational means for securing a distal end of said locking bracket to a proximal end of said lever captivating plate;
wherein when said front brake lever is actuated, an electrical signal is conducted to said vacuum solenoid, resulting in a retraction of said solenoid cable;
wherein said retraction of said solenoid cable causes said swivel means to swivel said locking bracket;
wherein when said locking bracket swivels, said locking bracket causes said rotational means to rotate said lever captivating plate; and,
wherein said rotation of said lever captivating plate retains said clutch lever of said motorcycle in a disengaged state.

16. The lock of claim 15, wherein said handlebar clamp comprises:
a handlebar clamp first half having a first hemispherical cutout;
a handlebar clamp second half having a second hemispherical cutout; and,
a pair of handlebar clamp fasteners configured to removably secure said first hemispherical cutout and said second hemispherical cutout about said first handlebar.

17. The lock of claim 16, wherein said solenoid clamp comprises:
a solenoid clamp first half having a third hemispherical cutout;
a solenoid clamp second half having a fourth hemispherical cutout; and,
a pair of solenoid clamp fasteners configured to removably secure said third hemispherical cutout and said fourth hemispherical cutout about said solenoid.

18. The lock of claim 17, wherein said solenoid cable clamp comprises:
a solenoid cable clamp first half having a fifth hemispherical cutout;
a solenoid cable clamp second half having a sixth hemispherical cutout; and, a pair of solenoid cable clamp fasteners configured to removably secure said fifth hemispherical cutout and said sixth hemispherical cutout about said second handlebar.

19. The lock of claim 18, wherein said swivel means comprises:
a cable end swivel secured at a first end to said distal end of said solenoid cable and secured subjacent said proximal end of said locking bracket; and,
a swivel means fastener which swivelly secures said cable end swivel to said locking bracket.

20. The lock of claim 19, wherein said rotational means comprises:
an axle bolt rotationally securing said proximal end of said lever captivating plate to said distal end of said locking bracket; and,
a sleeve disposed about said axle bolt and between said lever captivating plate and said locking bracket;
wherein said sleeve maintains a distance between said lever captivating plate and said locking bracket.

21. The lock of claim 20, wherein said lever captivating plate comprises a pair of protrusions defining a space between each protrusion capable of encompassing a portion of said clutch lever.

* * * * *